United States Patent [19]

Nishibe

[11] 4,408,276

[45] Oct. 4, 1983

[54] READ-OUT CONTROL SYSTEM FOR A CONTROL STORAGE DEVICE

[75] Inventor: Shinji Nishibe, Hachioji, Japan

[73] Assignee: Tokyo Shibaura Denki Kabushiki Kaisha, Kawasaki, Japan

[21] Appl. No.: 85,596

[22] Filed: Oct. 17, 1979

[30] Foreign Application Priority Data

Oct. 24, 1978 [JP] Japan .............................. 53-130052

[51] Int. Cl.³ .............................................. G06F 9/26
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,976,977 | 8/1976 | Porter et al. | 364/200 |
| 4,079,459 | 3/1978 | Grant, Jr. | 364/200 |
| 4,080,648 | 3/1978 | Asano et al. | 364/200 |
| 4,099,230 | 7/1978 | Mead | 364/200 |
| 4,103,328 | 7/1978 | Dalmasso | 364/200 |

*Primary Examiner*—Thomas M. Heckler

*Attorney, Agent, or Firm*—Finnegan, Henderson, Farabow, Garrett & Dunner

[57] ABSTRACT

In a read-out control system for a control storage device having a selector switch to select address information, a control storage means which responds to address information applied from the selector switch through a driver to produce a microinstruction from an address specified by the address information, a microinstruction register for holding a microinstruction read out from the control storage device, and an address register with a count function to increment the address information from the selector switch, the address register with a count function stores the address information currently stored in the control storage device at either the leading or trailing edge of a first supplementary clock signal produced in the machine cycle, and counts up the address information stored by +1 in synchronism with a second supplementary clock signal which rises or falls at the leading edge or the trailing edge of the machine clock signal representing the start of the next machine cycle.

7 Claims, 26 Drawing Figures

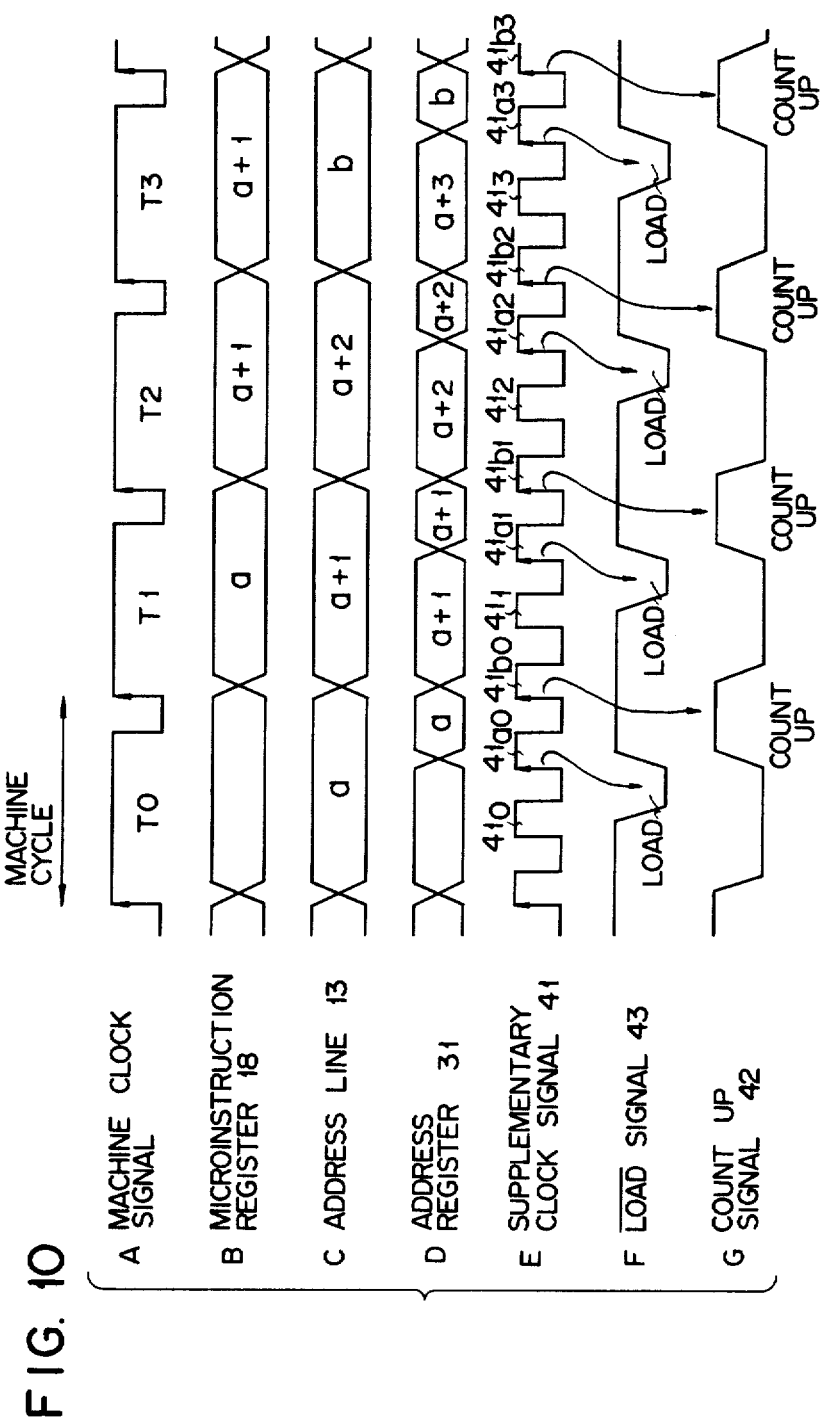

READ-OUT CONTROL SYSTEM FOR A CONTROL STORAGE DEVICE

BACKGROUND OF THE INVENTION

The present invention relates to a read-out control system for a control storage device in a data processing unit of a microprogram controlled type.

In general, the microprogram controlled type data processor is provided with a control storage device storing a microprogram having a number of microinstructions within a microprogram control device of a central processing unit. In this type data processor, a microinstruction read out from the control storage device is transferred through a microinstruction register to a decoder where the microinstruction is decoded to produce signals for controlling an arithmetic logic portion, as disclosed in U.S. Pat. No. 3,391,394.

The construction of this type data processor is as shown in FIG. 1 and operates as diagramatically illustrated in FIG. 2. When the CPU (central processing unit) executes a user instruction, a start address information A of a microprogram to control the execution of the user instruction is transferred through a signal line 11 to a selector switch 12. Upon receipt of the information A, the selector switch 12 selects the information A to send it onto an address line 13 at the leading edge of a machine clock signal as shown in FIG. 2A. The start address information A selected then is applied through a driver 14 to a control storage device 15. Upon application of the address information A, a microinstruction is read out from an address of the control storage device 15 specified by the start address information A.

The address information A is applied to one of the input terminals of an adder 16 where it is incremented by the value '1' inputted through a signal line 17 to produce address information A+1. Then, at the leading edge of the machine clock signal T1 shown in FIG. 2A, the microinstruction read out from the control storage device 15 (referred to as a microinstruction A in this case) is stored in a microinstruction register 18. See FIG. 2B.

The address information A+1 which is an output signal from the adder 16 is stored in the address register 19. At this time, when the microinstruction A designates a sequential read out of microinstructions from the control storage device 15, the selector switch 12 selects the address A+1 stored in the address register 19, as shown in FIG. 2D, and sends it onto the address line 13, as shown in FIG. 2C. Succeedingly, the next microinstruction A+1 is read out from the control storage device 15 in synchronism with the machine clock signal T2 shown in FIG. 2A.

If, for example, when the microinstruction A+2 read out from the control storage device into the microinstruction register 18, is a branch instruction, address information B set in an address field to which the program microinstruction A+2 is to be branched is sent out onto a signal line 20 to the selector switch 12. On the basis of the address information B, the selector switch 12 selects the address information B to send it onto the address line 13. The address information B then reads out a microinstruction B of the control storage device 15 specified by the information B. When an interrupt takes place in the CPU, the selector switch 12 selects a specified interrupt address and transfers it to the control storage device 15. As described above, the address circuit for the conventional control storage device 15 employs a logic circuit arrangement to prepare the address information of the next microinstruction by using the adder 16. Accordingly, when the number of bits of the address information increases, the circuit construction of the adder 16 is complicated in a like degree.

An example of this type address circuit is marketed with trade names "microprogram sequencers Am 2909 and Am 2911" by Advanced Micro Devices Inc. The detail of the microprogram sequencers is discussed in "The Am 2900 Family Data Book with Related Support Circuits" Copyright ©1978.

SUMMARY OF THE INVENTION

Accordingly, an object of the invention is to provide a read-out control system for a control storage device which is capable of preparing address information with a simple circuit construction regardless of the number of bits of the address information.

Another object of the invention is to provide a read-out control system for a control storage device to time-control an address register constructed by a counter chip with a counter function so as to have the same address preparation function as that of the conventional adder.

To achieve the above-mentioned objects, there is provided a read-out control system for a control storage device in a data processor of a microprogram controlled type which is provided with a control storage device storing a microprogram including a number of microinstructions, and executes one microinstruction every machine cycle normally defined by a machine clock signal, comprising: a selector switch means for selecting a start address, a next address, a branch address, and an interrupt address, a driving means connected to the selector switch means to produce address information coming from the selector switch means; a control storage means connected to the driving means which responds to the address information transferred from the driving means to produce a microinstruction from the address specified by the address information; a microinstruction register means connected to the control storage means which holds the microinstruction outputted from the control storage means, and produces an output signal for transfer to a decoder; an address register means which is constructed by an address register with a counter function connected between the input and the output of the selector switch means in which a location address of the control storage means storing a microinstruction to next be executed is prepared under control of a supplementary clock signal producing at least two clock signals in the machine cycle.

A major feature of the invention resides in that an address register constructed by a counter chip with a count function is controlled by the supplementary clock with shorter periods than those of the machine clock signal to form address information to read out the next microinstruction.

Other objects and features of the invention will be apparent from the following description taken in connection with the accompanying drawings, in which:

BRIEF DESCRIPTION OF THE DRAWINGS

FIGS. 10A to 10G show timing charts useful in explaining the operation of another embodiment according to the invention.

DETAILED DESCRIPTION OF THE PREFERRED EMBODIMENTS

Figure 1:
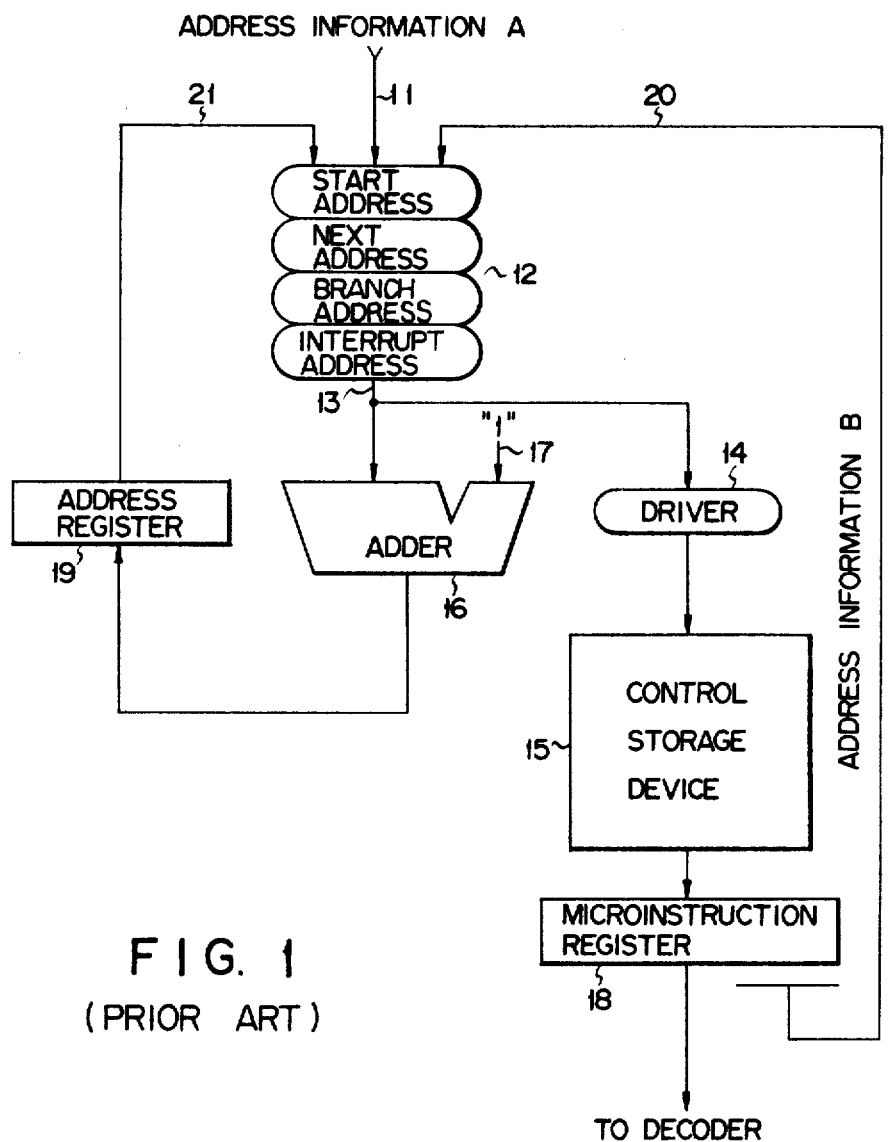
FIG. 1 shows a block diagram of a read control circuit for a conventional control storage device.
Figure 3:
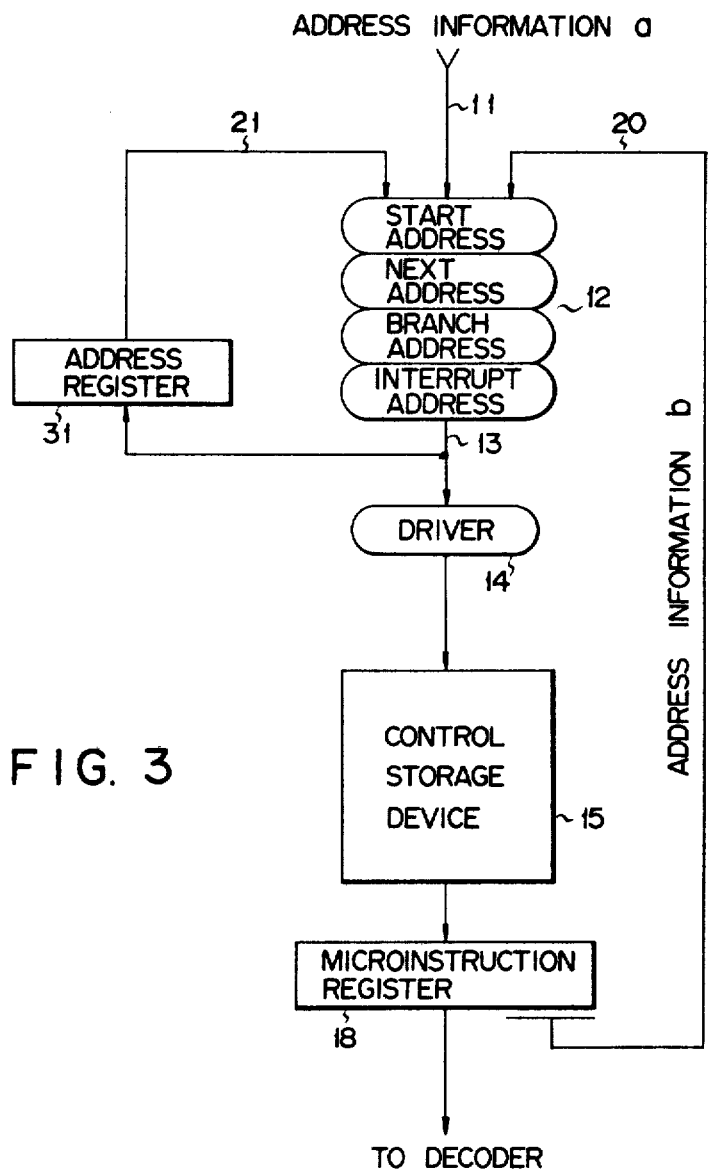
FIG. 3 shows a block diagram of an embodiment of a read-out control circuit for a control storage device according to the invention.
Figure 4:
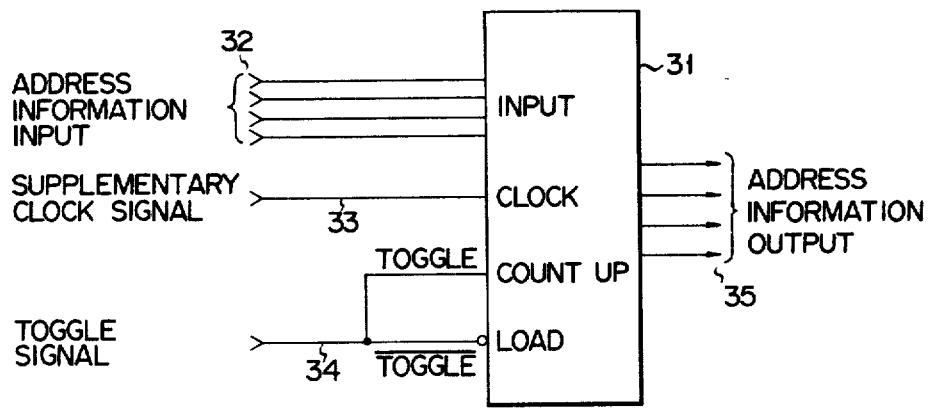
FIG. 4 shows a block diagram of an embodiment of an address register of 4-bit capacity which is an example of a simple construction of the address register shown in FIG. 3.

Turning now to FIG. 3, there is shown in block form an embodiment of a read-out control circuit for a control storage device according to the invention. In the figure, like reference symbols are used to designate like portions shown in FIG. 1. In the figure, reference numeral 31 designates an address register with a count function. A 4-bit address register, which is an example of a simple circuit arrangement of the address register 31 according to the invention, is illustrated in FIG. 4. Practically, however, the address register 31 is constructed by using a plurality of MSIs (medium scale integration circuit) of TTL type including positive counters commercially available which are as shown in FIG. 4. The details of the address register will be described later.

The address register 31 shown in FIG. 4 stores 4-bit address information 32. Applied to the clock terminal of the address register 31 is a supplementary clock signal 33 shown in FIG. 7E with a frequency double that of a machine clock signal shown in FIG. 7A. A toggle signal 34 is applied to the count-up terminal of the address register and an inverted toggle signal formed by inverting the toggle signal 34 is applied to the load terminal.

Figure 2:
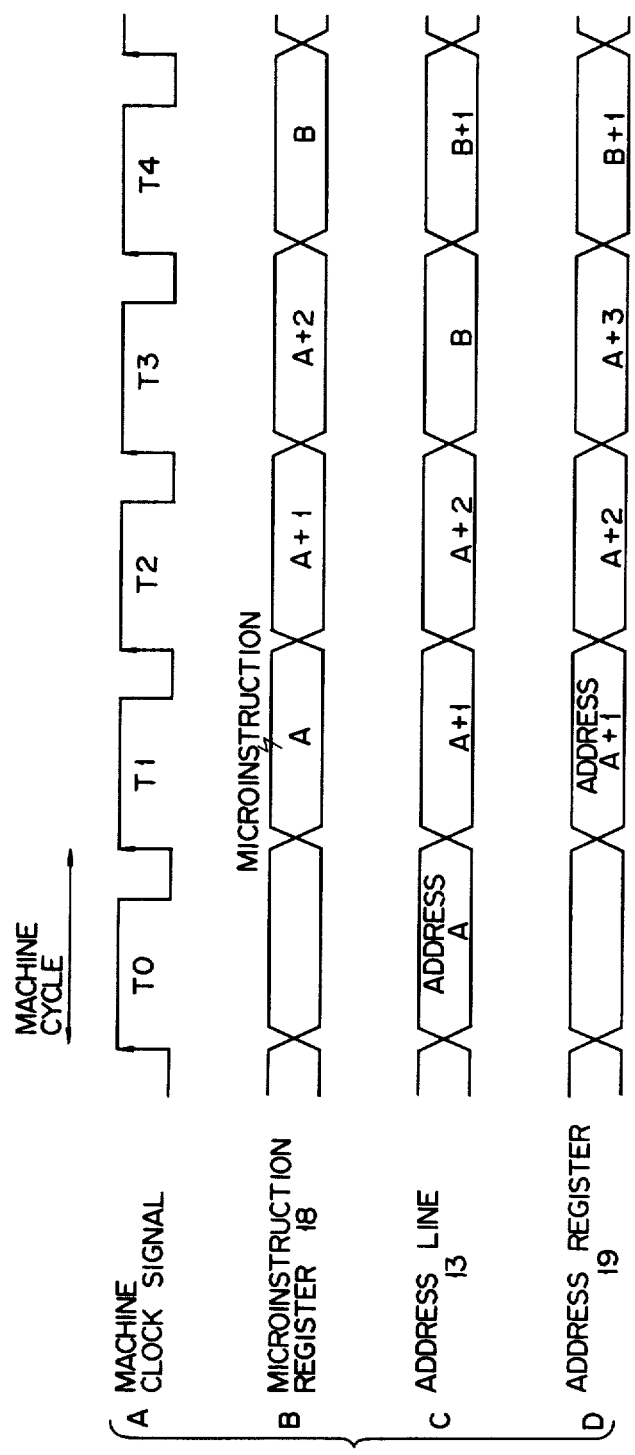
FIGS. 2A to 2D show timing diagrams useful in explaining the operation of the read control circuit shown in FIG. 1.

From the address register 31, the address information 35 counted up is outputted. It is evident that the bit length of the address register 31 is set depending on the storage capacity of the control device 15. For example, when the storage capacity of the control storage device is 256 words or less, two counters shown in FIG. 2 are needed. When the storage capacity is 4 K (K=1024) words or less, three counters shown in FIG. 4 are necessary. An actual circuit construction of the address counter will be described with reference to FIG. 6.

Figure 6:
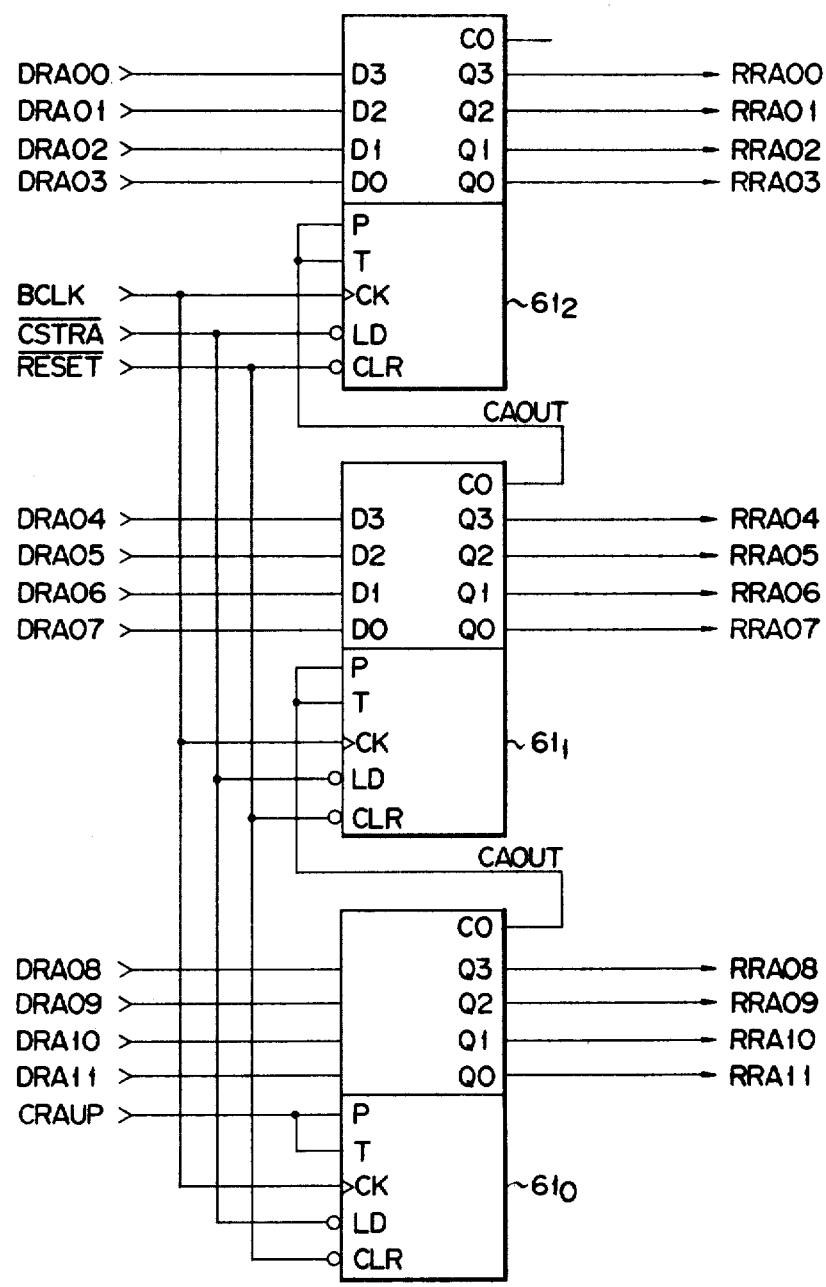
FIG. 6 shows a circuit arrangement of a 12-bit address register constructed by using three 4-bit binary counters, which is an example of the address register shown in FIG. 3.

Turning now to FIG. 6, there is shown a circuit arrangement of the address register 31 with a 12-bit address length. It is assumed that the control storage device has a storage capacity of 4 K words. In the figure, reference numerals $61_0$, $61_1$ and $61_2$ designate 4-bit binary counters of the same constructions, respectively. In other words, in order to address the control storage device 15 with 4 K words, three 4-bit binary counters 61 are necessary. This type binary counter may be Am 74S161 manufactured by Advanced Micro Devices Inc.

In the counters $61_0$, $61_1$, and $61_2$, D0 to D3 designate input terminals for parallel input terminal signals (DRA00 to DRA03, DRA04 to DRA07, and DRA08 to DRA11) to four flip-flops. Q0 to Q3 designate output terminals of four output signals (RRA00 to RRA03, RRA04 to RRA07, RRA08 to RRA11) derived from the counters $61_0$, $61_1$, and $61_2$. LD designates an input terminal of a parallel enable signal ($\overline{\text{CSTRA}}$).

When the $\overline{\text{CSTRA}}$ signal is LOW in level, the respective counters $61_0$, $61_1$ and $61_2$ are so conditioned that the address information at the parallel input signal terminals D0 through D3 are allowed to be inputted thereinto. When the $\overline{\text{CSTRA}}$ signal is HIGH in level, the counters $61_0$, $61_1$ and $61_2$ are ready for counting. The $\overline{\text{CSTRA}}$ signal acts like the $\overline{\text{TOGGLE}}$ signal shown in FIG. 4. Reference symbol P designates an input terminal of the count up signal (CRAUP). The CRAUP signal is applied to the P terminal of the counter $61_0$ (lower 4 bits) shown in FIG. 6. When counter $61_0$ counts, the CRAUP is HIGH. The CRAUP signal acts like the TOGGLE signal shown in FIG. 4. T is an input terminal of the count enable trickle signal. The count enable trickle signal may be identical with the CRAUP signal. The CRAUP signal of HIGH is applied also to the T terminal of the counter $61_0$, as illustrated in the embodiment. C0 is an output terminal of a carry out signal (CAOUT).

In the countup operation, the CAOUT signal is applied from the counter $61_0$ to the P and T terminals of the counter $61_1$ to render the P, T terminals HIGH. Upon this, the counter $61_1$ is counted up. The count-up operation of the counter $61_1$ also needs a condition that the $\overline{\text{CATRA}}$ signal is HIGH.

A relation between the counters $61_0$ and $61_1$ is correspondingly applied between the counters $61_1$ and $61_2$. Therefore, the description of the latter is omitted. CK designates an input terminal of the clock pulse signal (BCLK). At the leading edge of the BCLK signal, displacements of the address information derived from the output terminals Q0 through Q3 are performed. CLR designates an input terminal of the master reset signal ($\overline{\text{RESET}}$).

When an asynchronous $\overline{\text{RESET}}$ signal is LOW, the address information from the output terminals Q0 through Q3 are all LOW irrespective of the input signal. By connecting three 4-bit binary counters $61_0$, $61_1$ and $61_2$ in series, the 12-bit binary counter i.e., a device capable of both storing and incrementing, is formed which is essential to the invention. The 4-bit binary counter 61 is discussed in "Schottky and Low-power Schottky Data Book Including Digital Signal Processing Handbook" Second Edition, Copyright 1977 by Advanced Mirco Devices Inc. pages 4-85 through 4-88.

Figure 7:
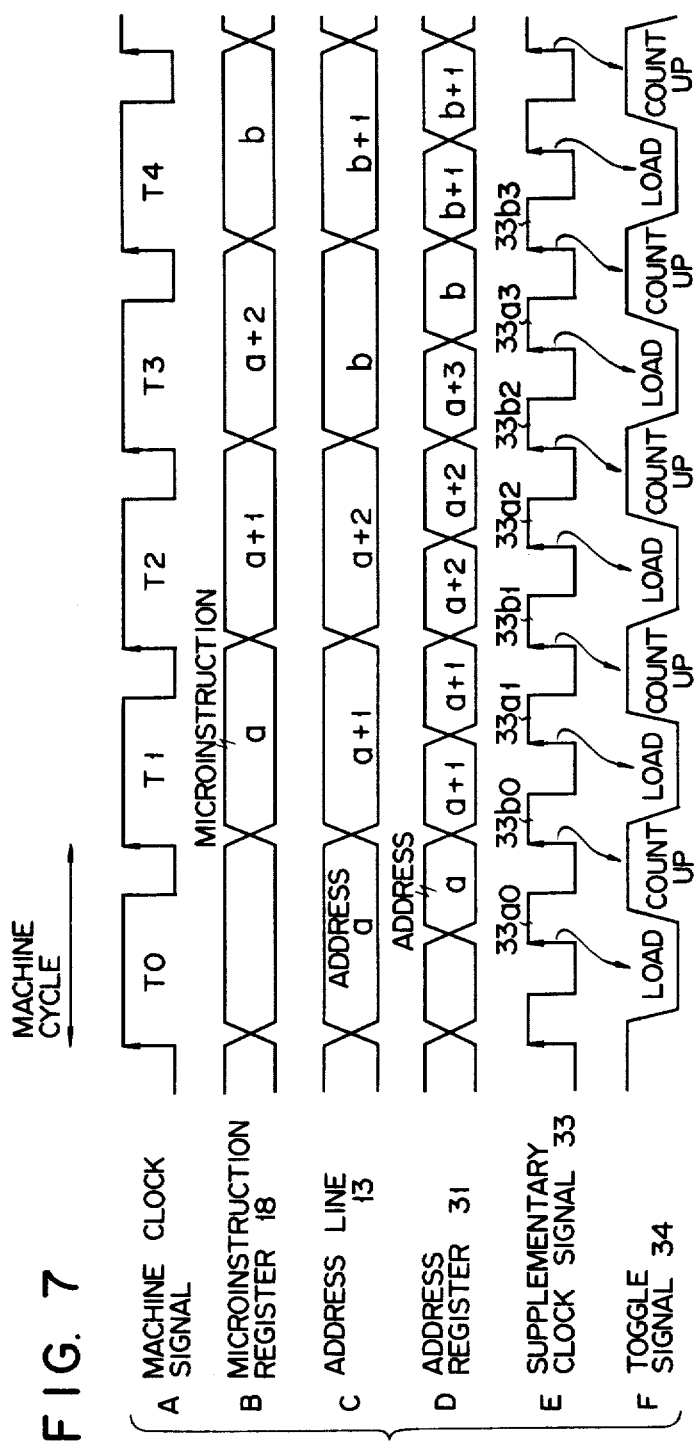
FIGS. 7A to 7F show timing charts useful in explaining the operation of the read-out control circuit for the control storage device shown in FIG. 3.

The operation of the read-out control system will be described as follows referring to FIGS. 3 and 7 and the operation of the address register 31 will be described with reference to FIG. 4. FIG. 7 shows a set of timing diagrams for illustrating the operation of the system of FIG. 3.

When a user instruction is executed, a start address information a of a microprogram for executing the user instruction is sent out onto the signal line 11. The selector switch 12 transmits the address information a onto the address line 13, as shown in FIG. 7C, in synchronism with the leading edge of the machine clock signal T0 shown in FIG. 7A. The address information a is applied to the control storage device 15 through the drive 14 to read out the microinstruction a therefrom.

As shown in FIG. 7D, the address information a is applied to the address register 31. In the machine cycle, when the supplemental clock signal $33a_0$ in the first half of the machine cycle rises, if the toggle signal 34 is LOW ('0'), as shown in FIG. 7F, the address register 31 stores the address information a coming in through the address line 13 (the address information 32 shown in FIG. 4) in response to the toggle signal. When the machine clock signal T1 shown in FIG. 7A rises, the microinstruction read out from the control storage device 15 is loaded into the microinstruction register 18. The supplemental clock signal $33b_0$ rises at the same time.

At this time, when toggle signal 34 is HIGH ('1'), as shown in FIG. 7F, the address register 31 counts up by 1 the address information a currently stored therein in response to the toggle signal, so that the stored contents thereof becomes the address information a+1. The address information a+1 is sent out onto the signal line 21.

At this time, when the microinstruction a read out from the control storage device is so set to be sequentially read out, the selector switch selects the address information a+1 transmitted through the signal line 21 from the address register 31 and sends it onto the address line 13, as shown in FIG. 7C. The address information a+1 outputted onto the address line 13 is applied to the control storage device 15 through the driver 14, so that the microinstruction a+1 is read out. The address information a+1 is also applied to the address register 31 as shown in FIG. 7D.

At this time, during the machine clock signal T1 (one machine cycle) when the supplementary clock signal $33a_1$ in the first half of the machine cycle rises and the toggle signal 34 becomes LOW ('0'), as shown in FIG. 7F, the address register 31 stores the address information a+1 transferred thereto through the address line 13 in response to the toggle signal. When the machine clock signal T2 rises, the microinstruction a+1 read out from the control storage device 15 as shown in FIG. 7B is loaded into the microinstruction register 18. Also, supplementary clock signal $33b_1$ in the latter half rises simultaneously with the clock signal T2, as shown in FIG. 7E. At this time, when the toggle signal 34 is HIGH ('1'), as shown in FIG. 7F, the address register 31 counts up the address information a+1 currently stored therein in response to the toggle signal, so that the contents stored therein becomes the address information a+2, as shown in FIG. 7C. Then, the address information a+2 is sent out onto the signal line 21.

Through similar operations, the address register 31 prepares the next address information to sequentially read out the microinstructions from the control storage device. When the microinstruction read out from the control storage device 15 into the microinstruction register 18 is a branch instruction, the address information b set in the branch address field of the microinstruction a+2 is sent out onto the signal line 20. Then, as shown in FIG. 7C, the selector switch 12 selects the address information b and sends it out onto the address line 13.

As described above, the selected address information b is applied through the driver 14 to the control storage device 15 to read out the microinstruction b therefrom. The address information b is applied to the address register 31.

At this time, during the machine clock signal T3 (one machine cycle), when the supplementary clock signal $33a_3$ in the first half rises as shown in FIG. 7E, and the toggle signal 34 is LOW ('0'), as shown in FIG. 7F, the address register 31 stores the address information b+1 through the address 13 in response to the toggle signal. Then, when the machine clock signal T4 rises, the microinstruction b read out from the control storage device 15 is loaded into the microinstruction register 18. The supplementary clock signal 33b in the latter half rises simultaneously with the machine clock, as shown in FIG. 7E. At this time, when the toggle signal 34 is HIGH ('1'), the address register 31 counts up the address information b currently stored therein in response to the toggle signal, so that the contents stored therein become the address information b+1. The address information b+1 is sent out onto the signal line 21.

The circuit shown in FIG. 6 is also subjected to the same control as that illustrated in the timing diagrams of FIG. 7. This will be well understood when the toggle signal, and the toggle signal as described referring to FIG. 7F are changed into the CRAUP signal (the CAOUT signal in the counters $61_1$ and $61_2$) and the $\overline{CSTRA}$ signal shown in FIG. 6.

Figure 5:
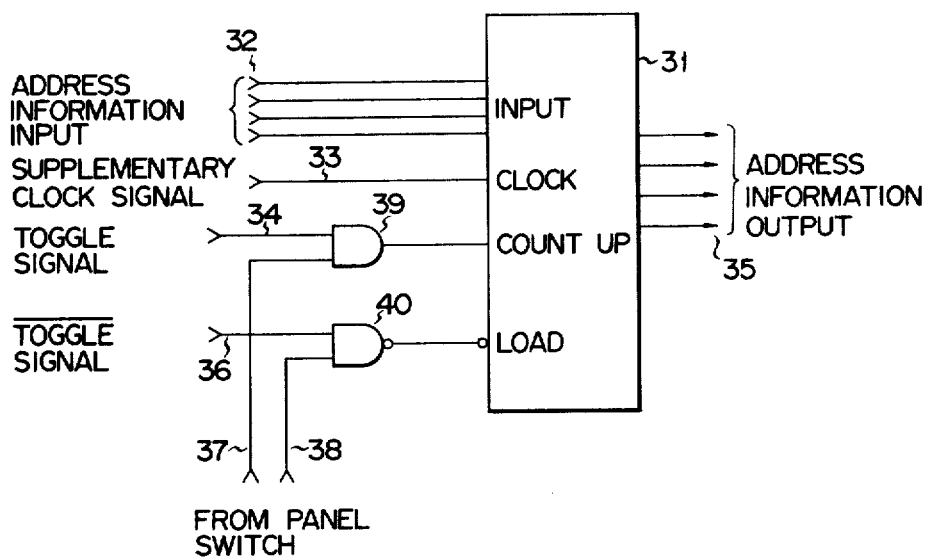
FIG. 5 shows a block diagram of another embodiment of the 4-bit address register.

FIG. 5 shows a circuit construction to control the start and the stop of the reading of the microinstruction and to control the execution of the microinstruction step by step. The operation of FIG. 5 is similar to that of FIG. 4, so that the explanation will be made putting emphasis on different points from those of FIG. 4.

In order to control the start/stop, the toggle signal 36 is applied through the gate circuit 40 to the load terminal of the address register 31. In the NAND gate 40, when the toggle signal 36 is HIGH ('1') and the control signal 38 is HIGH ('1'), the logic product holds to permit the toggle signal 36 to reach the load terminal. Accordingly, by rendering the control signal 38 HIGH ('1') or LOW ('0'), the start and the stop of the read-out of the microinstruction may be controlled.

Controlling the execution of the microinstruction step by step, it is realized that the toggle signal 34 is applied to the count-up terminal through the AND gate circuit 39. The AND gate 39 is enabled when the toggle signal 34 is HIGH ('1') and the control signal 37 is HIGH ('1'), so that the toggle signal 34 is applied to the count up terminal. Accordingly, when the control signal 37 is rendered HIGH ('1') or LOW ('0'), the step-by-step execution of the microinstruction may be controlled. The control signals 37 and 38 are obtained through the ON and OFF operations of the pulse switch, for example. The address register 31 shown in the figure may also be the same construction as that shown in FIG. 6.

Figure 8:
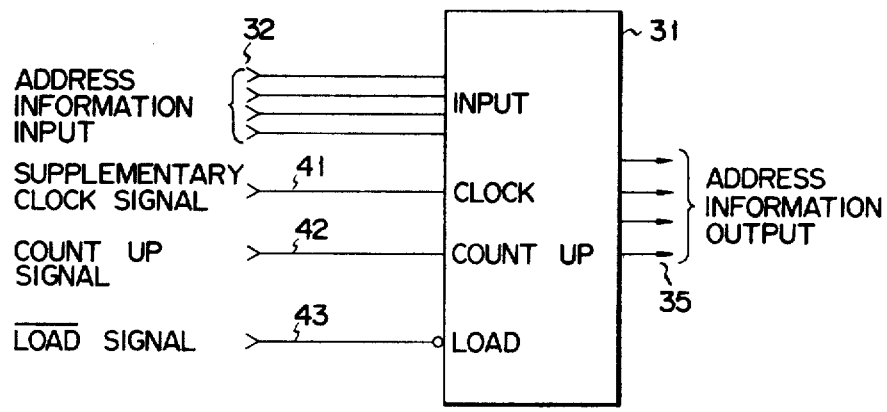
FIG. 8 shows a block diagram of an embodiment of a 4-bit address register which is an example of a simple construction of the address register used in another embodiment of the read-out control circuit according to the invention.

Another embodiment of the read control system for a control storage device according to the invention will be described with reference to FIGS. 8 and 10. The major circuit construction shown in FIG. 8 is the same as that shown in FIG. 4 of the first embodiment, except that a signal applied to the address register 31 is different from that of the first embodiment. As shown in the figure, to the clock terminal of the address register 31 is applied a supplementary clock signal with a frequency three times that of the machine clock signal. To the count-up terminal is applied a count-up signal 42. Further to the load terminal is applied a $\overline{\text{LOAD}}$ signal 43.

The operation of the second embodiment is much the same as that of the first embodiment. Accordingly, only the essential point will be briefed with reference to FIG. 10 illustrating timing charts thereof. During a machine clock signal To, when the second supplementary clock signal $41a_0$ rises, if the load signal is LOW ('0') as shown in FIG. 10F, the address information a on an address line 13 is stored in the address register 31, as shown in FIG. 10D. When a supplementary clock signal $41b_0$ shown in FIG. 10E, which rises simultaneously with the machine clock signal T1 shown in FIG. 10A, rises, if the count-up signal 42 is HIGH ('1'), as shown in FIG. 10G, the address register 31 counts up the address information currently stored therein to prepare address information to read out the next microinstruction. Even if the first supplementary signal $41_0$ rises within the machine cycle, this embodiment exhibits no reaction to it.

Figure 9:
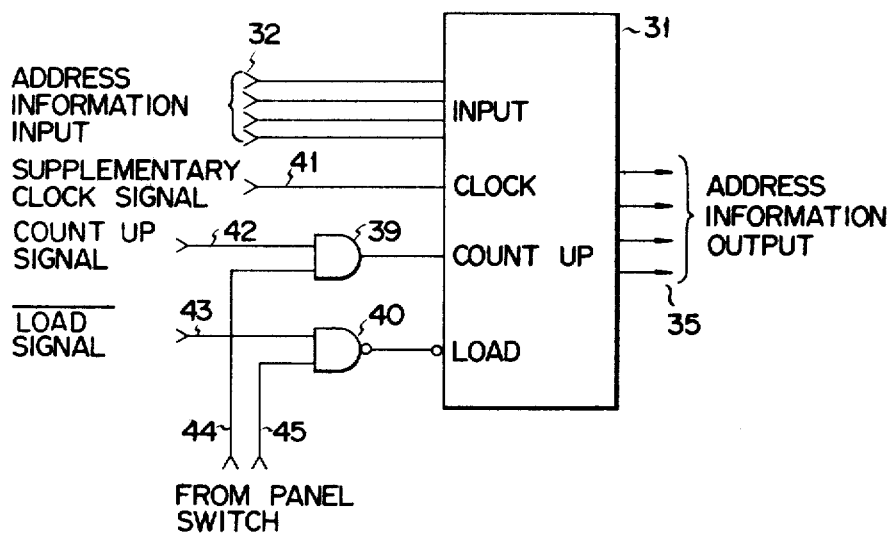
FIG. 9 shows a block diagram of another embodiment of a 4-bit address register which is an example of a simple construction of the address register used in another embodiment of the read-out control circuit according to the invention.

To control the start/stop control of the read-out of the microinstruction and to execute step by step the microinstructions, the circuit construction as shown in FIG. 9 may be used. The timing control of the circuit in FIG. 9 is similar to that of the embodiment shown in FIG. 5. The control of the start/stop is realized by applying the LOAD signal 43 to the load terminal through a NAND circuit 40 gate-controlled by the control signal 45. The control of the step-by-step execution of the microinstructions is performed by applying the toggle signal 42 to the count-up terminal through an AND circuit 39 gate-controlled by the control signal 44. This is effective when the time required to read-out a microinstruction from the control storage device is less than ½ of one machine cycle. In other word, if the read-out of the microinstruction is within ½ of one machine cycle, the half-clock system of the first embodiment effectively operates. However, the half-clock system is ineffective for the case where the read-out time is ⅔ machine cycle or more. For such a case, the ⅓ clock system of the second embodiment is effective.

The second embodiment also is useful for such a circuit construction that a microinstruction read out from the control storage device 15 is directly applied to the decoder, not by way of the microinstruction register 18. That is, when it is applied to the decoder by way of the register 18, a relatively long time is taken from the start of the machine cycle until the decoder produces an output.

When a branch instruction is issued, an address to which the operation jumps is loaded into the address register after the middle point. In this case, in the second embodiment shown in FIGS. 8 and 9, by directly applying the microinstruction to the decoder not by way of the microinstruction register, the branch address may be correctly loaded into the address register at the timing of ⅔ of a machine cycle.

What is claimed is:

1. A read-out control system for use in a microprogram program-controlled data processor wherein microinstruction are singly supplied in successive machine cycles for execution by the data processor, the machine cycles being defined by a machine clock signal, the read-out control system comprising:

selector switch means for selectively outputting during a first machine cycle a start address, a next address, a branch address or an interrupt address;
  control storage means connected to said selector switch means for storing microinstructions at a plurality of address locations and for outputting a said stored microinstruction from a said address location responsive to any one of said addresses outputted by said selector switch means;
  microinstruction register means connected to said control storage means for receiving said microinstruction outputted from said control storage means; and
  address register means directly coupled to said selector switch means for storing said address outputted by said selector switch means and for incrementing said address to form said next address in a time period sufficient to supply said next address as an input to said selector switch means at the next machine cycle, wherein a plurality of supplementary clock signals correspond to a single machine clock signal, the rising edge of the first of said plurality of supplementary clock signals corresponding to a said machine clock cycle occurring simultaneously with the rising edge of said corresponding machine clock signal and the following edge of the last of said plurality of supplementary clock signals occurring simultaneously with the following edge of said corresponding machine clock signal, said address register means for storing said address outputted by said selector switch means during the first of said plurality of supplementary clock signals corresponding to said machine clock signal and for incrementing said address stored therein during the last of said plurality of supplementary clock signals corresponding to said machine clock signal.

2. A read-out control system according to claim 1 wherein the frequency of said supplementary clock signal is twice the frequency of said machine clock signal.

3. A read-out control system according to claim 1 wherein the frequency of said supplementary clock signal is three times the frequency of said machine clock signal.

4. A read-out control system according to claim 1 wherein said address register means comprises a multiple bit binary counter.

5. A read-out control system for use in a microprogram program-controlled data processor wherein microinstructions are singly supplied in successive machine cycles for execution by the data processor, the machine cycles being defined by a machine clock signal, the read-out control system comprising:

selector switch means for selectively outputting during a first machine cycle a start address, a next address, a branch address, or an interrupt address;
  control storage means connected to said selector switch means for storing microinstructions at a plurality of address locations and for outputting a said stored microinstruction from a said address location responsive to any one of said addresses outputted by said selector switch means;
  microinstruction register means connected to said control storge means for receiving said microinstruction outputted from said control storage means;

address register means for receiving and storing said selected address outputted by said selector switch means and for incrementing said received and stored address to form said next address in a time period sufficient to supply said next address as an input to said selector switch means at the next successive machine cycle;

means for supplying a plurality of supplementary clock signals corresponding to each of said machine clock signals, the rising edge of the first of said plurality of supplementary clock signals corresponding to a said machine clock signal occurring simultaneously with the rising edge of said corresponding machine clock signal and the falling edge of the last of said plurality of supplementary clock signals occurring simultaneously with the falling edge of said corresponding machine clock signal, said address register means for storing said address outputted by said selector switch means during the first of said plurality of supplementary clock signals corresponding to said machine clock signal and for incrementing said address stored therein during the last of said plurality of supplementary clock signals corresponding to said machine clock signal; and means for supplying a load signal and a toggle signal, said toggle signal being the inverse of said load signal, said address register means including input terminal means for receiving said selected address outputted by said selector switch means, a clock terminal for receiving said supplementary clock signal, a count up terminal for receiving said toggle signal, and a load terminal for receiving said load signal, and wherein when said supplementary clock signal and said load signal are simultaneously received by said address register means, said address received at said input terminal means is loaded into said address register means, and when said supplementary clock signal and said toggle signal are simultaneously received by said address register means following said loading of said received address into said address register means said loaded address is incremented and supplied to said selector switch means.

6. A read-out control system according to claim 5 further including:

means for supplying a first control signal and a second control signal;

first gate circuit means for receiving said first control signal and said load signal and for supplying said load signal to said load terminal only upon the simultaneous occurrence of said first control signal and said load signal; and second gate circuit means for receiving said second control signal and said toggle signal and for supplying said toggle signal to said count up terminal only during the simultaneous occurrence of said second control signal and said toggle signal.

7. A read-out control system according to claim 6 or 5 wherein said address register means comprises a multiple bit binary counter.

* * * * *